US012043251B2

(12) United States Patent
Maurer et al.

(10) Patent No.: US 12,043,251 B2
(45) Date of Patent: Jul. 23, 2024

(54) DETERMINING A POTHOLE-AVOIDING TRAJECTORY OF A MOTOR VEHICLE

(71) Applicant: Ford Global Technologies, LLC, Dearborn, MI (US)

(72) Inventors: Georg Johann Maurer, Cologne (DE); Cyril Coerman, Leverkusen (DE)

(73) Assignee: Ford Global Technologies, LLC, Dearborn, MI (US)

(*) Notice: Subject to any disclaimer, the term of this patent is extended or adjusted under 35 U.S.C. 154(b) by 376 days.

(21) Appl. No.: 17/584,628

(22) Filed: Jan. 26, 2022

(65) Prior Publication Data

US 2022/0242404 A1 Aug. 4, 2022

(30) Foreign Application Priority Data

Feb. 3, 2021 (DE) .................. 102021102526.5

(51) Int. Cl.
*B60W 30/09* (2012.01)

(52) U.S. Cl.
CPC ....... *B60W 30/09* (2013.01); *B60W 2420/403* (2013.01); *B60W 2420/408* (2024.01);
(Continued)

(58) Field of Classification Search
CPC ............ B60W 30/09; B60W 2552/35; B60W 2554/802; B60W 2420/408;
(Continued)

(56) References Cited

U.S. PATENT DOCUMENTS 6,085,129 A * 7/2000 Schardt .................. G01C 23/00
701/14
9,457,802 B2 10/2016 Ponziani
(Continued)

FOREIGN PATENT DOCUMENTS

WO WO-2016183074 A1 * 11/2016 ......... B60G 17/0182
WO WO-2017118907 A1 * 7/2017 .......... B60W 30/095

OTHER PUBLICATIONS

Rui et al., "Pothole Detection Based on Disparity Transformation and Road Surface Modeling," 2020, vol. 29, Publisher: IEEE.*
(Continued)

*Primary Examiner* — Tuan C To
(74) *Attorney, Agent, or Firm* — Frank A. MacKenzie; Bejin Bieneman PLC

(57) ABSTRACT

A method for determining a trajectory of a motor vehicle for a driver assistance function includes: determining an initial trajectory of the motor vehicle on a road; setting an upper threshold for the lateral acceleration of the motor vehicle; detecting data of the road surface in the direction of travel ahead of the motor vehicle with at least one sensor; determining the vertical profile of the road surface of a plurality of paths running parallel to each other in the direction of travel ahead of the motor vehicle by using the data; determining, when the vertical profile of at least one of the paths indicates a pothole, a lateral deviation from the initial trajectory for which a limit value does not exceed the set upper threshold for the lateral acceleration, wherein the road boundary is not exceeded; and outputting an adjusted trajectory by using the determined lateral deviation.

18 Claims, 3 Drawing Sheets

(52) U.S. Cl.
CPC ..... *B60W 2420/54* (2013.01); *B60W 2520/10* (2013.01); *B60W 2520/125* (2013.01); *B60W 2530/16* (2013.01); *B60W 2530/20* (2013.01); *B60W 2552/35* (2020.02); *B60W 2554/802* (2020.02)

(58) Field of Classification Search
CPC ....... B60W 2420/403; B60W 2420/54; B60W 2520/10; B60W 2520/125; B60W 2530/16; B60W 2530/20
USPC .......................................................... 701/26
See application file for complete search history.

(56) References Cited

U.S. PATENT DOCUMENTS

| | | | |
|---|---|---|---|
| 10,407,065 | B2 | 9/2019 | Liu et al. |
| 10,699,135 | B2* | 6/2020 | Zhang .................... G08G 1/167 |
| 10,782,129 | B2* | 9/2020 | Maucher .................. G01C 7/04 |
| 11,306,450 | B2* | 4/2022 | Sohn ........................ E01C 23/01 |
| 11,373,532 | B2* | 6/2022 | Kundu .................... G06V 20/56 |
| 2015/0266455 | A1* | 9/2015 | Wilson ................. G05D 1/0276 |
| | | | 701/93 |
| 2016/0325753 | A1* | 11/2016 | Stein ................. B60W 50/0097 |
| 2019/0001965 | A1 | 1/2019 | Cho et al. |
| 2020/0172121 | A1 | 6/2020 | Krishnappa et al. |
| 2020/0408897 | A1* | 12/2020 | Westerhoff .............. G01S 13/08 |

OTHER PUBLICATIONS

Ionut et al., "Pothole detection and tracking in car video sequence," 2016, Publisher: IEEE.*

* cited by examiner

DETERMINING A POTHOLE-AVOIDING TRAJECTORY OF A MOTOR VEHICLE

CROSS-REFERENCE TO RELATED APPLICATION

This patent application claims priority to German Application No. DE 102021102526.5 filed on Feb. 3, 2021, which is hereby incorporated by reference in its entirety.

BACKGROUND

The present disclosure relates to a method for determining a trajectory of a motor vehicle for a driver assistance function.

Due to the advent of driver assistance systems or autonomous driving systems, more and more control and vehicle guidance tasks are being relieved from the human driver. However, it is possible that the maneuvers carried out by relevant assistance systems or autonomous systems will meet with low acceptance on the part of the driver if the assisted or autonomous driving maneuvers deviate from the driver's driving style or from the driver's preferred driving maneuvers. To the extent that the autonomy of the assistance system increases, the possibility of low acceptance on the part of the driver also increases. An example of this is a lane keeping assistance system, which completely takes over the lateral control of the vehicle. In situations where the vehicle is driving on a road with potholes, the driver would drive around the potholes as much as possible, i.e., adjust the trajectory of the vehicle by steering maneuvers in such a way to avoid driving through the potholes. On the other hand, a lane keeping assistance system would follow the central path on the road and therefore not avoid potholes. This difference in driving style leads to the aforementioned difficulties in the acceptance of driver assistance system maneuvers.

U.S. Pat. No. 9,457,807 B2 describes a method for automatically centering a vehicle in a lane and/or changing lanes. A reference path is determined and this is adjusted based on static or moving objects in the area of the reference path which are detected by sensors. Furthermore, in the area of a bend, the curvature of the path is reduced as much as possible. Obstacles in front of the vehicle are avoided by a corresponding adjustment of the path and the vehicle speed. U.S. Pat. No. 10,407,065 B2 describes a method and device for planning the speed of a vehicle. By means of radar and a camera, possible obstacles in front of the motor vehicle are detected and the speed of the vehicle is adjusted accordingly.

US Published Application No. 2019/0001965 A1 describes a method for vehicle control, wherein the control is adjusted according to the road surface and in particular an uneven road surface, which is detected by means of a sensor, is taken into account. US Published Application No. 2020/0172121 A1 describes a method for providing recommendations during the navigation of a motor vehicle on a road. Sensors, such as cameras, are used to record environmental data and monitor characteristics of the road, such as the presence of potholes, obstacles and the like. As a result, corresponding notifications are issued to a user.

SUMMARY

The present disclosure includes an improved method for determining a trajectory of a motor vehicle for a driver assistance function, for example for use in a lane keeping assistance system, which leads to improved driving comfort and increased acceptance on the part of the user and enables the avoidance of potholes based on or similar to human driving behavior. Other objects include providing a corresponding driver assistance system, a motor vehicle, a method for at least partially autonomous control of a motor vehicle, a computer-implemented method, and a non-transitory computer-readable storage medium having stored thereon instructions to perform the method.

An implementation of a method for determining a trajectory of a motor vehicle for a driver assistance function relates to a motor vehicle which includes at least one sensor for detecting the road surface in the direction of travel, such as ahead of the motor vehicle, or which is designed for use in such a motor vehicle. The method may be designed for use in the context of a lane keeping assistance system. The sensor can be designed to detect road markings.

The method according to an implementation includes the following steps. A first step determines an initial trajectory for the movement of the motor vehicle on a road based upon determination of a road boundary. The initial trajectory can be determined, for example, by means of a well-known lane keeping assistance system. In a next step, an upper threshold value for a lateral acceleration of the motor vehicle is determined. In other words, the maximum permissible lateral acceleration of the motor vehicle is determined. This can be done depending on the current operating condition of the motor vehicle, in particular on the current speed of the motor vehicle and/or the curvature of the road and/or the weather conditions and/or the condition of the road surface.

In a further step, the road surface in the direction of travel ahead of the motor vehicle is detected by means of a sensor. Subsequently, the vertical profile, i.e., an elevation profile, of the road surface of a plurality of paths running parallel to each other in the direction of travel ahead of the motor vehicle is determined by using the data detected by the sensor. For this purpose, for example, existing software of a camera can be used, with which the elevation profile of the road can be determined automatically. Paths are trajectories or lines on the road surface in the direction of travel. If the vertical profile of the road surface of at least one of the paths has a road depression which has defined characteristics for classifying the road depression as a pothole, a lateral deviation from the initial trajectory is determined for which a limit value formed by using the specified upper threshold for lateral acceleration is not exceeded, wherein the road boundary is not exceeded. The lateral deviation can be a displacement or offset of the initial trajectory perpendicular to the direction of travel. In a further step, a trajectory adjusted according to the determined lateral deviation, i.e., an evasive trajectory, is output. The steps described above do not necessarily have to be performed in the order mentioned. Unless the individual steps necessarily build on each other, the sequence of execution of the steps is not fixed.

The described method has the advantage that it makes it possible, in the context of a lane keeping assistance system, to avoid potholes as far as possible without leaving the lane marked by road boundaries and without degrading the comfort of the driver. The driving behavior is thus approximated to a typical driving behavior of a human driver. This increases the acceptance of a corresponding driver assistance function by a user.

The motor vehicle is controlled at least partially autonomously, and in some cases completely, by means of the driver assistance function. In connection with fully autonomously controlled motor vehicles, the described method contributes to a significant increase in driving comfort.

The sensor for detecting the road surface may include, for example, a camera, in particular a front camera, and/or a radar sensor and/or a lidar sensor and/or an ultrasonic sensor and/or a laser sensor. In an implementation, sensors already present on the motor vehicle can be used to carry out the method according to the disclosure. Thus, a retrofit and implementation of the method according to the disclosure is possible.

The plurality of paths may include at least one path arranged in the direction of travel to the right of the current trajectory of the motor vehicle and at least one path arranged in the direction of travel to the left of the current trajectory of the motor vehicle. A path arranged to the right of the current trajectory can be a path defined by the track of the right tire and a path arranged to the left of the current trajectory can be a path defined by the track of the left tire. The number of paths provided influences the accuracy of the adjusted trajectory to be determined with a view to avoiding a pothole as closely as possible and not on a large scale. The more paths there are, the more precisely a detected pothole can be bypassed, in other words, the smaller the required offset, or the lateral deviation from the initial trajectory. In an implementation, between two and five paths arranged to the right of the current trajectory are provided and between two and five paths arranged to the left of the current trajectory are provided. In another implementation, three paths arranged to the right of the current trajectory and three paths to the left of the current trajectory are provided.

The specified features for grading, such as for classification, of the road depression as a pothole may include the length, i.e., the horizontal extent, and/or the depth, i.e., the vertical extent, and/or the width, i.e., the lateral extent, of the road depression. Upper and lower threshold values or range information can be defined for the length and/or depth and/or width of the road depression.

In an implementation, the current speed of the motor vehicle is recorded and the current distance of the motor vehicle from the pothole is determined. The limit value, i.e., the aforementioned limit value, which is not exceeded when determining the lateral deviation from the initial trajectory, is calculated by using the current speed and distance.

If the pothole is present in all paths, the pothole is further classified in terms of resistance for each path. Resistance means the force acting on the motor vehicle due to the pothole when driving over or driving through the pothole. This can be a horizontal and/or vertical force, which leads to a corresponding resistance. The horizontal force can be a lateral and/or longitudinal force. Alternatively or prior to the classification, the resistance caused by the pothole can be determined for each path. The path with the lowest defined and/or classified resistance is determined. Furthermore, the lateral distance of the initial trajectory from this path is determined. Subsequently, the lateral deviation from the initial trajectory in the direction of the determined path with the lowest resistance is determined. Since the pothole is present in all paths in the described variant, an adjusted trajectory is determined in the described way, wherein the portion of pothole with the lowest possible resistance is driven through.

If the pothole is not present in all paths, the smallest lateral distance of the initial trajectory is determined from a path in which there is no pothole. This lateral distance is defined as a lateral deviation if the limit value is not exceeded for it. If the limit value is exceeded for this lateral distance as a lateral deviation, a smaller lateral deviation, preferably taking into account the width of the tires of the motor vehicle, will be determined for which the limit value is not exceeded. Due to the described design, the pothole can be at least partially avoided without compromising the comfort of the driver or the stability of the vehicle.

The driver assistance system according to the disclosure has an evaluation device which is designed to receive signals from a sensor for detecting the road surface in the direction of travel ahead of the vehicle. Furthermore, the evaluation device is designed for the execution of a previously described method according to the invention. The driver assistance system according to the invention has the features and advantages already mentioned in connection with the method according to an implementation.

The motor vehicle according to the disclosure comprises a previously described driver assistance system according to the invention and has the already mentioned features and advantages. The motor vehicle can be a passenger car, a truck, a bus or a minibus, for example.

The method according to the disclosure for at least partially autonomous control of a motor vehicle according to the invention is characterized in that the movement of the motor vehicle is controlled along a trajectory determined by means of the driver assistance system. The method may also be designed for the completely autonomous control of a motor vehicle.

The computer-implemented method according to the invention includes commands which, when executing the program by a computer, cause it to execute a method according to the invention described above. The computer program product according to the invention comprises commands which, when executing the program by a computer, cause it to execute a method according to the invention described above. The computer-readable data carrier according to the invention is characterized in that the previously described computer program product is stored on it. The data carrier signal according to the invention transmits the computer program product according to the invention. The described computer-implemented method according to the invention, the computer program product, the computer-readable data carrier and the data carrier signal are each suitable for retrofitting of existing driver assistance systems.

The disclosure is explained in more detail below on the basis of exemplary implementations with reference to the attached figures. Although the disclosure is illustrated and described in more detail by the exemplary implementations, it is not limited by the disclosed examples and other variations can be derived from this by the person skilled in the art without departing from the scope of the claims.

DETAILED DESCRIPTION

The figures are not necessarily detailed and true to scale and may be shown enlarged or reduced to provide a better overview. Therefore, functional details disclosed here are not to be understood restrictively, but only as an illustrative basis which provides guidance to the person skilled in this field of technology to use the present invention in a variety of ways.

The term "and/or" used herein, when used in a series of two or more elements, means that each of the listed elements can be used alone, or any combination of two or more of the listed elements can be used. If, for example, a composition is described which contains the components A, B and/or C, the composition may contain A alone; B alone; C alone; A and B in combination; A and C in combination; B and C in combination; or A, B, and C in combination.

Figure 1:
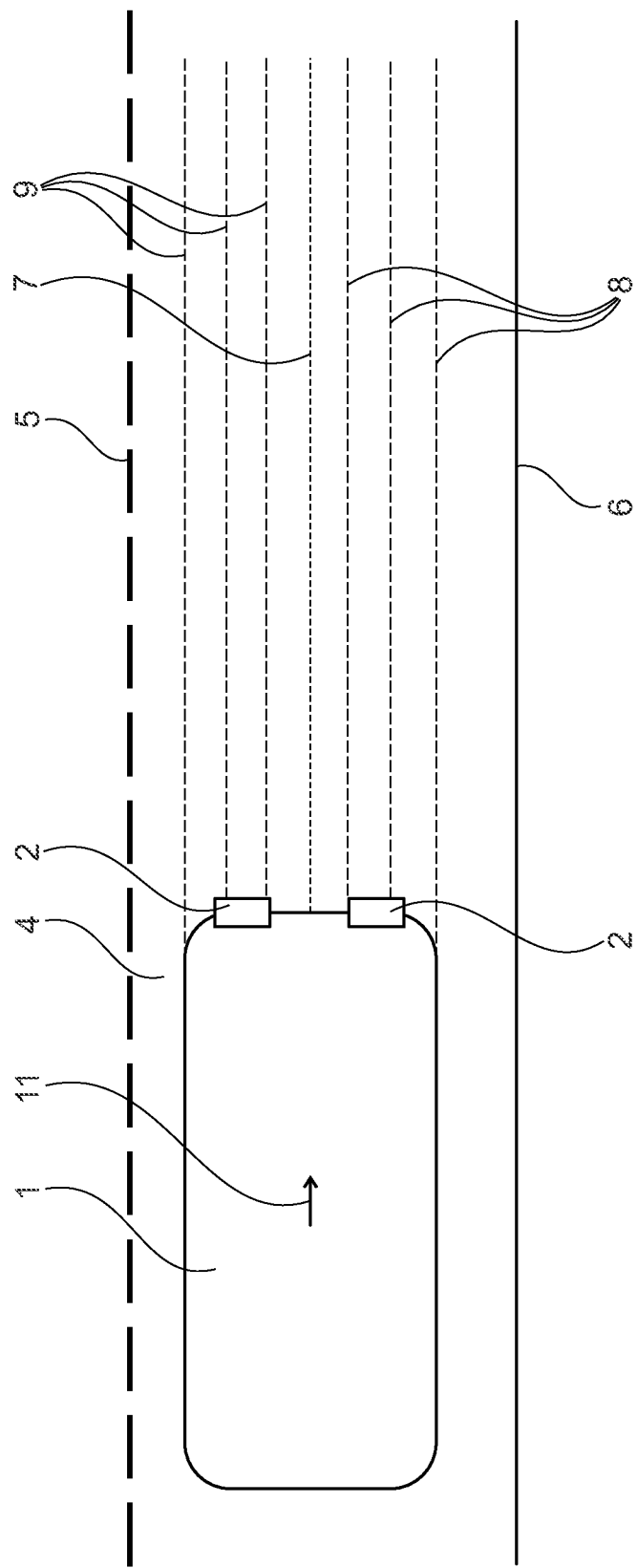
FIG. 1 shows a schematic top view of a road with a motor vehicle according to an implementation.

FIG. 1 shows schematically a motor vehicle 1 according to an implementation, which is moving on a road 4 in a direction of travel marked by the arrow 11 along a trajectory 7. The road 4 has lane boundary lines, in the example shown as an outer lane boundary line 6, and a center line 5.

The motor vehicle 1 includes a number of sensors 2, including at least one sensor 2 for detecting the road surface 4 in the direction of travel 11. The at least one sensor 2 may be a camera, for example a front camera, and/or a radar sensor and/or a lidar sensor and/or an ultrasonic sensor and/or a laser sensor. By means of at least one sensor 2, the road 4 is detected with regard to road depressions along a plurality of paths 8, 9 running parallel to each other in the direction of travel 11 ahead of the motor vehicle 1. In the example shown, the road is monitored with regard to depressions of the road surface 4 along three paths 8 arranged to the right of an initial trajectory 7 and along three paths 9 arranged to the left of an initial trajectory 7. A right inner path, a right middle, and a right outer path 8 are provided and a left inner path, a left middle and a left outer path 9 are provided. The number of paths and their arrangement relative to each other can be defined individually. The example shown is only an exemplary configuration.

Figure 2:
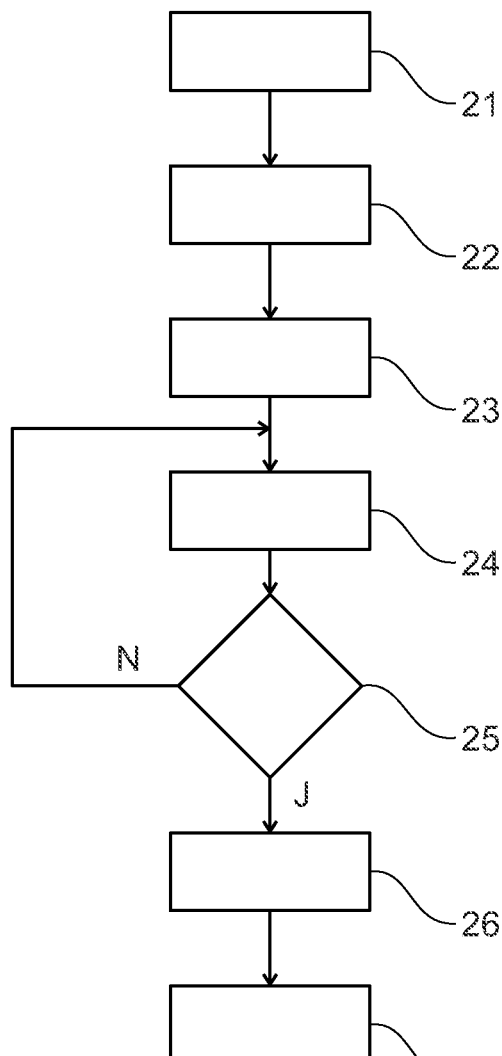
FIG. 2 shows a flow chart of a general variant of a method according to an implementation.

A general example of a method according to the disclosure for determining a trajectory of a motor vehicle 1 is explained below based on a flowchart of FIG. 2. In step 21, an initial trajectory 7 is first determined for the movement of motor vehicle 1 on a road 4, which has a road boundary 5, 6. In step 22, an upper threshold for permissible lateral acceleration of the motor vehicle 1 is determined. In step 23, the road surface 4 in the direction of travel 11 ahead of the motor vehicle 1 is detected by means of the sensor 2.

Subsequently, in step 24, the elevation profile or the vertical profile of a plurality of paths 8, 9 running parallel to each other in the direction of travel 11 ahead of the motor vehicle 1 is determined by using the data detected by the sensor 2. In step 25, it is checked whether at least one of the paths has a road depression, which has defined characteristics for classifying the road depression as a pothole. If this is not the case, the method jumps back to step 24. If this is the case, in step 26 a lateral deviation from the initial trajectory is determined for which a limit value formed by means of the specified upper threshold for lateral acceleration is not exceeded and for which the road boundary 5, 6 is not exceeded. Subsequently, in step 27, a trajectory adjusted by using the lateral deviation determined in step 26, i.e., adjusted according to the road surface, is output.

The grading or classification of a road depression as a pothole can be based on the length or the horizontal extent and/or the depth and/or the vertical extent and/or the width or the lateral extent of the road depression. In a simple design, a pothole can be regarded as detected if a detected road depression exceeds a specified threshold value.

By using the data detected by the sensor 2, the distance $x_{prev}$ of the motor vehicle from the pothole, as well as the depth and length of the detected pothole, may be determined for each of the paths considered. Furthermore, the current vehicle speed $v_{veh}$ may be detected. These data may be taken into account when setting the limit value.

Another implementation of a method according to the disclosure is explained below on the basis of FIG. 3. The flow chart shown is linked to step 25 of the method described in FIG. 2, i.e., to the case in which a road depression has been detected, which has defined characteristics of a pothole. For such a detected pothole, it is checked in step 31 whether or not it is present in all paths 8, 9 considered.

If the detected pothole is not present in all the paths considered, as represented by step 32, it is calculated below whether the motor vehicle can be steered to the nearest path in which no pothole is detected without exceeding the specified limit value. For this purpose, in step 33 the distance $di_{at}$ from the nearest path in which there is no pothole is determined. If in step 34 the determined distance is less than a limit determined according to the following formula, $d_{lat} < 0.5 * A_{thr} * (x_{prev}/v_{veh})^2$, then in step 35 the distance $d_{lat}$ from the nearest path without a pothole is determined as a lateral deviation and is output as a correspondingly adjusted trajectory. $A_{thr}$ is the specified upper threshold for the permissible lateral acceleration, $x_{prev}$ is the distance of the motor vehicle from the detected pothole and $v_{veh}$ is the vehicle speed.

The upper threshold of lateral acceleration can be selected from determined vehicle operating modes. For example, in the context of a sporty driving mode, a higher value may be determined for the upper threshold of the lateral acceleration and a lower value for a comfort mode. Thus, if the lateral distance $d_{lat}$ is less than the calculated limit value determined on the basis of the vehicle speed, the distance of the motor vehicle from the pothole and the specified upper threshold for permissible lateral acceleration, the distance $d_{lat}$ is added as an offset or displacement to the initial trajectory 7 and thus the detected pothole is bypassed.

If in step 36 the value $d_{lat}$ is greater than the calculated limit, i.e. $d_{lat} > 0.5 * A_{thr} * (x_{prev}/v_{veh})^2$, then in step 37 a new lower value for the lateral deviation or offset value $d_{lat2}$ is calculated. For example, the formula $d_{lat2} = \max((d_{lat} - 0.5 * w_{tire}), (0.5 * w_{tire}))$ can be used. $w_{tire}$ is the width of the tires. The lower offset value $d_{lat2}$ is calculated because the motor vehicle cannot travel a trajectory calculated by using the distance $d_{lat}$ without exceeding the upper limit value for the lateral acceleration. The first part of the calculation formula is the required lateral deviation to move the edges of the wheels along the desired path $(d_{lat} - 0.5 * w_{tire})$ The second part of the equation calculates the lateral deviation to move half the width of the tire outside the original path $(0.5 * w_{tire})$. The aim of this calculation is to determine the best possible trajectory in which the pothole is not completely bypassed laterally, but at least half of the tire width is sufficient to prevent the wheel from sinking into the pothole.

If in step 38 the value $d_{lat2}$ can be reached without exceeding the upper threshold for lateral acceleration $A_{thr}$, i.e. $d_{lat2} < 0.5 * A_{thr} * (x_{prev}/v_{veh})^2$, in step 39 the value $d_{lat2}$ is added to the initial trajectory as a lateral deviation.

If in step 40 the value $d_{lat2}$ cannot be reached without exceeding the upper threshold $A_{thr}$, i.e. $d_{lat2} > 0.5 * A_{thr} * (x_{prev}/v_{veh})^2$, a new value for the lateral deviation or displacement or offset value $d_{lat3}$ is calculated in step 41, for example using the formula $d_{lat3} = \min((d_{lat} - 0.5 * w_{tire}), (0.5 * w_{tire}))$. In principle, this is the same as for the calculation of the value $d_{lat2}$, wherein the minimum value is used instead of the maximum value. If the value $d_{lat3}$ can be reached without exceeding the upper threshold for the lateral acceleration, i.e., 42 applies, then in step 43 this value $d_{lat3}$ is added as a lateral displacement or lateral deviation to the initial trajectory 7.

If in step 44 the value $d_{lat3}$ cannot be achieved without exceeding the upper limit for the lateral acceleration, i.e. $d_{lat3}<0.5*A_{thr}*(x_{prev}/v_{veh})^2$, no modification of the initial trajectory is made in step 45. In this case, the required adjustment would cause too much lateral acceleration, which in turn would lead to less acceptance on the part of the user and thus not to an improvement in driving comfort.

If in step 46 the pothole was detected in all the paths considered, for example in all six paths, 8 and 9, the pothole is classified individually for all paths in step 47. Based on the classification, in step 48 the path with the lowest resistance and the distance $d_{lat}$ thereof from the initial trajectory 7 is determined. If an improved crossing of the pothole is possible when switching to this path, this path can be selected, wherein in step 49 the maximum possible lateral deflection $d_{max}$ or the lateral displacement of the vehicle without exceeding the upper threshold for lateral acceleration is determined, for example according to the formula $d_{max}=0.5*A_{thr}*(x_{prev}/v_{veh})^2$.

The sign (i.e., + or −) and thus the direction of the maximum possible lateral displacement $d_{max}$ is selected depending on the distance between the initial trajectory and the desired path or the desired displacement $d_{lat}$. The sign is selected in step 50. The goal is to select the maximum possible offset in the direction of the path with least resistance. This is implemented by equating the sign to the direction. In step 51, the trajectory is modified by means of the value $d_{max}$ determined in step 50, wherein it is ensured that when the motor vehicle is steered along the modified trajectory, the upper limit for the permissible lateral acceleration $A_{thr}$ is not exceeded, $sign(d_{max})=sign(d_{lat})$.

Figure 3:
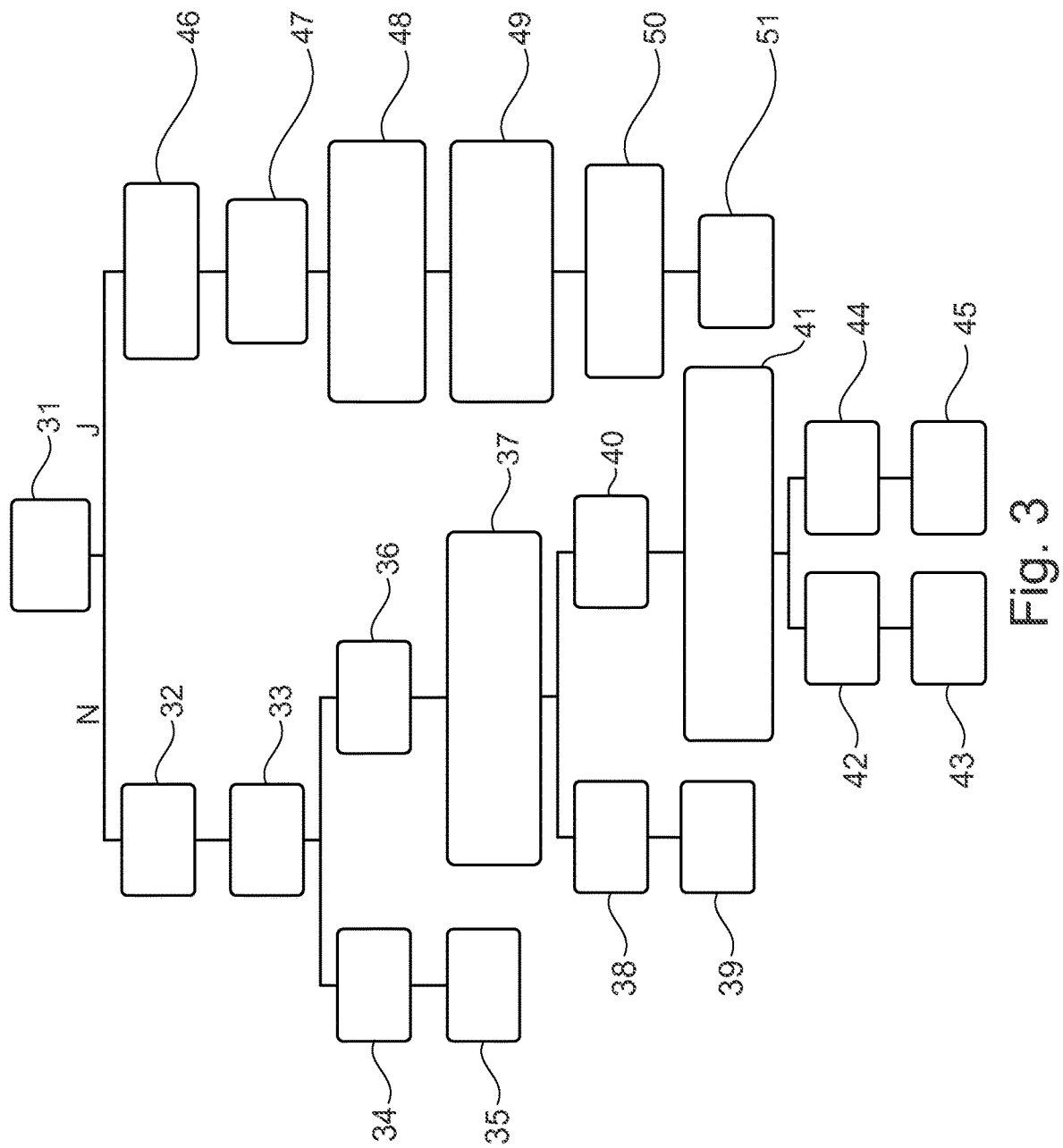
FIG. 3 shows a flow chart of another variant of a method according to an implementation.

As part of the method shown in FIG. 3, it is checked at an appropriate point that the modification of the initial trajectory does not exceed the road boundaries. This can be carried out, for example, in the context of steps 35, 39, 43 and 51. The distance of the individual paths and the initial trajectory from the respective road markings 5, 6 can be determined from the data about the road surface 4 detected by means of the sensor 2.

In an implementation, after the trajectory 7 has been adjusted and the motor vehicle 1 has passed through the pothole, the modification is reversed, i.e. the lateral offset or the lateral deviation added to the initial trajectory in the context of the method is subtracted again and the movement of the motor vehicle 1 is continued on the initial trajectory 7. The adjustment of the trajectory 7 both when adding an offset and when later subtracting the offset to or from the initial trajectory is preferably carried out with a lateral acceleration adjusted according to the respective speed of the motor vehicle in order to achieve a high level of driving comfort and thus a high acceptance of the evasive maneuver on the part of the user.

Figure 4:
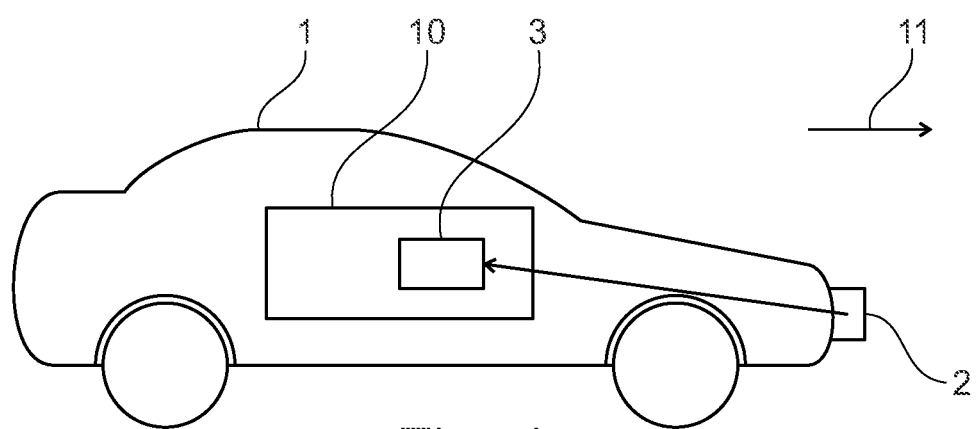
FIG. 4 shows a motor vehicle according with a driver assistance system according to an implementation.

FIG. 4 shows schematically a motor vehicle 1 according to the disclosure. The motor vehicle 1 includes a driver assistance system 10. The driver assistance system 10 includes an evaluation device 3, such as a computer, ECU, or other processor with a storage for storing executable instructions. The motor vehicle 1 comprises at least one sensor 2 for detecting the road surface in the direction of travel ahead of the motor vehicle 1. The evaluation device 3 is designed to receive signals from the sensor 2. This is indicated by an arrow.

REFERENCE CHARACTER LIST

1 Motor vehicle
2 Sensor
3 Evaluation device
4 Road
5 Center line
6 Outer road boundary line
7 Trajectory
8 Path
9 Path
10 Driver assistance system
11 Direction of travel
21 Determining an initial trajectory
22 Determining an upper threshold for the lateral acceleration of the motor vehicle
23 Detection of the road surface in the direction of travel
24 Determining the vertical profile of the road surface of a plurality of paths running parallel to each other in the direction of travel ahead of the motor vehicle by using the data collected by the sensor
25 Does the vertical profile of at least one of the paths have a pothole?
26 Determining a lateral deviation from the initial trajectory, for which a limit value formed by means of the specified upper threshold for the lateral acceleration is not exceeded, and for which the road boundary is not exceeded
27 Outputting an adjusted trajectory
31 Pothole detected in all paths?
32 Pothole not present in all considered paths
33 Potholes present in all considered paths
34 $d_{lat}<0.5*A_{thr}*(x_{prev}/v_{veh})^2$
35 Determine the distance to the nearest path without a pothole as a lateral deviation
36 $d_{lat}>0.5*A_{thr}*(x_{prev}/v_{veh})^2$
37 Calculate the lower value for the lateral deviation $d_{lat2}$
38 $d_{lat2}<0.5*A_{thr}*(x_{prev}/v_{veh})^2$
39 add $d_{lat2}$ as the lateral deviation to the initial trajectory
40 $d_{lat2}>0.5*A_{thr}*(x_{prev}/v_{veh})^2$
41 Calculate the lower value for the lateral deviation $d_{lat3}$
42 $d_{lat3}<0.5*A_{thr}*(x_{prev}/v_{veh})^2$
43 Add $d_{lat3}$ as the lateral deviation to the initial trajectory
44 $d_{lat3}>0.5*A_{thr}*(x_{prev}/v_{veh})^2$
45 No modification of the initial trajectory
46 Potholes in all considered paths
47 Classify potholes for all paths individually
48 Determine the path with the lowest resistance and the lateral distance thereof from the initial trajectory $d_{lat}$
49 Determine the maximum possible lateral deviation
50 Choose the sign
51 Adjust the trajectory
N no
J yes

The invention claimed is:

1. A method for determining a trajectory of a motor vehicle for a driver assistance function, comprising:
   determining an initial trajectory of the motor vehicle on a road having a road boundary;
   setting an upper threshold for a lateral acceleration of the motor vehicle;
   detecting data of a road surface in a direction of travel ahead of the motor vehicle with at least one sensor;
   determining a vertical profile of the road surface of a plurality of paths running parallel to each other in the direction of travel ahead of the motor vehicle by using the data of the road surface;
   determining, when the vertical profile of at least one of the paths has a road depression which has defined characteristics for classifying the road depression as a pothole, a lateral deviation from the initial trajectory for which a limit value does not exceed the set upper threshold for the lateral acceleration, wherein the road boundary is not exceeded; and outputting an adjusted trajectory by using the determined lateral deviation.

2. The method of claim 1, including at least partially controlling the motor vehicle using the driver assistance function.

3. The method of claim 1, wherein the at least one sensor for detecting the road surface includes at least one of a camera, a radar sensor, a lidar sensor, an ultrasonic sensor, or a laser sensor.

4. The method of claim 1, wherein the plurality of paths include at least one path arranged in the direction of travel to a right side of a current trajectory of the motor vehicle and at least one path arranged in the direction of travel to a left side of the current trajectory of the motor vehicle.

5. The method of claim 1, wherein the defined characteristics for classifying the road depression as a pothole include at least one of a length, a depth, or a width of the road depression.

6. The method of claim 1, further including:
detecting a current speed of the motor vehicle;
determining a current distance of the motor vehicle from the pothole; and
setting the limit value based on the current speed and the current distance from the pothole.

7. The method of claim 1, wherein, upon determination that the pothole is present in all paths, further including:
classifying the pothole in terms of resistance for each path;
determining a path with the lowest resistance and a lateral distance of the initial trajectory from this path; and
determining the lateral deviation from the initial trajectory in the direction of the determined path.

8. The method of claim 1, wherein, upon determining that the pothole is not present in all paths, further including:
determining a shortest lateral distance of the initial trajectory from a path in which there is no pothole, the shortest lateral distance being determined as a lateral deviation when the limit value is not exceeded; and
determining a smaller lateral deviation for which the limit value is not exceeded when the limit value is exceeded for the shortest lateral distance as a lateral deviation.

9. The method of claim 8, wherein determining the smaller lateral deviation is based on at least one of a width of a tire of the motor vehicle, a current speed of the motor vehicle, or a current distance of the motor vehicle from the pothole.

10. A computing device for determining a trajectory of a motor vehicle for a driver assistance function and comprising a processor and a memory, the memory storing instructions executable by the processor, the instructions including instructions to:
determine an initial trajectory of the motor vehicle on a road having a road boundary;
set an upper threshold for a lateral acceleration of the motor vehicle;
receive data of a road surface in a direction of travel ahead of the motor vehicle from at least one sensor;
determine a vertical profile of the road surface of a plurality of paths running parallel to each other in the direction of travel ahead of the motor vehicle by using the data of the road surface;
determine, when the vertical profile of at least one of the paths has a road depression which has defined characteristics for classifying the road depression as a pothole, a lateral deviation from the initial trajectory for which a limit value does not exceed the set upper threshold for the lateral acceleration, wherein the road boundary is not exceeded; and outputting an adjusted trajectory by using the determined lateral deviation.

11. The computing device of claim 10, wherein the instructions to receive data of the road surface include instructions to receive data from at least one of a camera, a radar sensor, a lidar sensor, an ultrasonic sensor, or a laser sensor.

12. The computing device of claim 10, wherein the plurality of paths include at least one path arranged in the direction of travel to a right side of a current trajectory of the motor vehicle and at least one path arranged in the direction of travel to a left side of the current trajectory of the motor vehicle.

13. The computing device of claim 10, wherein the defined characteristics for classifying the road depression as a pothole include at least one of a length, a depth, or a width of the road depression.

14. The computing device of claim 10, wherein the instructions further include instructions to:
detect a current speed of the motor vehicle;
determine a current distance of the motor vehicle from the pothole; and
set the limit value based on the current speed and the current distance from the pothole.

15. The computing device of claim 10, wherein, upon determination that the pothole is present in all paths, the instructions further include instructions to:
classify the pothole in terms of resistance for each path;
determine a path with the lowest resistance and a lateral distance of the initial trajectory from this path; and
determine the lateral deviation from the initial trajectory in the direction of the determined path.

16. The computing device of claim 10, wherein, upon determining that the pothole is not present in all paths, the instructions further include instructions to:
determine a shortest lateral distance of the initial trajectory from a path in which there is no pothole, the shortest lateral distance being determined as a lateral deviation when the limit value is not exceeded; and
determine a smaller lateral deviation for which the limit value is not exceeded when the limit value is exceeded for the shortest lateral distance as a lateral deviation.

17. The computing device of claim 16, wherein the instructions to determine the smaller lateral deviation use at least one of a width of a tire of the motor vehicle, a current speed of the motor vehicle, or a current distance of the motor vehicle from the pothole.

18. A non-transitory computer-readable storage medium having stored thereon computer-executable instructions to cause a processor to perform operations to:
determine an initial trajectory of a motor vehicle on a road having a road boundary;
set an upper threshold for a lateral acceleration of the motor vehicle;
receive data of a road surface in a direction of travel ahead of the motor vehicle from at least one sensor;
determine a vertical profile of the road surface of a plurality of paths running parallel to each other in a direction of travel ahead of the motor vehicle by using the data of the road surface;
determine, when the vertical profile of at least one of the paths has a road depression which has defined characteristics for classifying the road depression as a pothole, a lateral deviation from the initial trajectory for which a limit value does not exceed the set upper threshold for the lateral acceleration, wherein the road boundary is not exceeded; and outputting an adjusted trajectory to a driver assistance function by using the determined lateral deviation.

* * * * *